United States Patent [19]

Holzman

[11] 4,119,362
[45] Oct. 10, 1978

[54] OPTICAL FIBER CONNECTOR UTILIZING OPPOSED LENSES

[75] Inventor: Melvyn A. Holzman, Boulder, Colo.

[73] Assignee: The Deutsch Company Electronic Components Division, Banning, Calif.

[21] Appl. No.: 767,692

[22] Filed: Feb. 11, 1977

Related U.S. Application Data

[63] Continuation-in-part of Ser. No. 635,806, Nov. 28, 1975, abandoned.

[51] Int. Cl.$^2$ .............................................. G02B 5/14
[52] U.S. Cl. .............................. 350/96.18; 350/96.21
[58] Field of Search .............. 350/179, 96 C, 96 WG, 350/320, 96.18, 96.21

[56] References Cited

U.S. PATENT DOCUMENTS

| 3,405,992 | 10/1968 | Hutson et al. | 350/179 X |
| 3,832,030 | 8/1974 | Gloge | 350/96 C X |
| 3,864,019 | 2/1975 | Smolinsky et al. | 350/96 WG |
| 3,944,328 | 3/1976 | Kent et al. | 350/320 X |
| 4,015,894 | 4/1977 | Rocton | 350/96.21 |

FOREIGN PATENT DOCUMENTS

| 1,946,693 | 8/1970 | Fed. Rep. of Germany | 350/96 C |
| 1,429,843 | 3/1976 | United Kingdom | 350/96 C |

OTHER PUBLICATIONS

Cohen et al., "Microlenses for Coupling Junction Lasers to Optical Fibers," *Applied Optics*, vol. 13, No. 1, Jan. 1974, pp. 89-94.

*Primary Examiner*—John K. Corbin
*Assistant Examiner*—John D. Lee
*Attorney, Agent, or Firm*—Gausewitz, Carr & Rothenberg

[57] ABSTRACT

This invention provides an arrangement for optical coupling, including interconnecting optical fibers, coupling a source to the fiber and coupling a fiber to a detector. The connector may comprise an objective lens and an immersion lens provided by opposed cavities in a transparent medium, each containing an index of refraction material, with the optical fibers to be connected inserted into the opposed cavities. Cavities also are used in source-to-fiber and fiber-to-detector coupling, being defined by surfaces of revolution and providing an aligning and positioning means. By appropriate selection of the indices of refraction of the index of refraction material and the transparent medium, the light from the emitting device is refracted and transmitted to the receiving device, resulting in low-loss light transmission. Means may be provided for changing the emittance angle so as to cause the light to be within the acceptance angle of the receiving device. In one embodiment at least one intermediate lens is positioned between the objective and immersion lenses.

57 Claims, 20 Drawing Figures

OPTICAL FIBER CONNECTOR UTILIZING OPPOSED LENSES

CROSS REFERENCE TO RELATED APPLICATION

This is a continuation-in-part of my copending patent application Ser. No. 635,806, filed Nov. 28, 1975 for Optical Fiber Connector, now abandoned.

BACKGROUND OF THE INVENTION

1. Field of the Invention

This invention relates to the connection of optical fibers.

2. Description of the Prior Art

Multiplex optical fiber communication systems, utilizing fibers that carry separate channels of information, require an efficient connecting means for joining individual fibers so that light can be transmitted from one to the other. If excessive losses are encountered at the connector, the entire system becomes impractical. In the past, efforts at fiber connection primarily have involved the butting of the ends of the fibers together, along with a suitable aligning and holding means, in an attempt to cause most of the light from the emitting fiber to be received in the core of the receiving fiber. These prior devices generally have been in the nature of laboratory models rather than practical, commercially usable connectors. Major losses in making butt-joint connections are incurred from transverse fiber misalignment, end separation of the fibers, angular fiber misalignment and Fresnel reflections. These factors present such formidable design problems that heretofore there has been no fully satisfactory optical fiber interconnecting device for joining individual optical fibers.

A further problem arises in the connection of light emitting sources to the optical fiber, as well as connection of the optical fiber to a light sensitive detector. Typically, sources are designed to meet the specific requirements of the fiber optic communication systems, and hence come in many configurations. Some of these requirements are power, radiance patterns, modulation characteristics, emitting area, and spectral characteristics. These sources are typically light emitting diodes (LED) or laser diodes (LD). Some of these sources have radiance characteristics with spatial and angular distributions that are much larger than the respective receiving fiber core area and acceptance angle. Direct fiber positioning results in inefficient coupling because of the spatial and angular mismatch. Other sources have radiance characteristics that have spatial distributions smaller than the receiving fiber core area with angular distribution that extends to angles larger than the acceptance angle of the fiber. The sources of the latter characteristic are inefficiently coupled by direct positioning of the fiber because much of the light impinging upon the receiving fiber will be at an angle greater than its maximum acceptance angle and so will not be trapped in this fiber and will be lost to the system.

At the output end of the optical fiber communication system, the light sensitive detectors also come with a variety of characteristics, and again, each detector is optimized for the requirements of the communication system. Systems which require high frequency response and high sensitivity are likely to use a detector which has a very small area. If the detector area is of the order of magnitude of the emitting fiber core area or smaller, direct positioning of the fiber becomes inherently inefficient.

SUMMARY OF THE INVENTION

The present invention provides a lens system in which the mode volumes of the system components are taken into account in arriving at optimum coupling efficiency. In multimode optical fibers, optical power is carried in many modes, which are characterized by the angles which the propagating rays make with the optical fiber axis.

Due to interference of light, only a finite number of modes can exist in a fiber. With known propagation characteristics of the power in each of the modes, it is possible to determine the radiance of the emitting end of a fiber as well as the transmission of power being launched into a fiber from a radiating fiber or other source. The powr coupled into a fiber is an integral of the incident radiance over the spatial and angular acceptance limits of the fiber. The integral over the spatial and angular limits is the mode volume. The mode volume of a source (LED, LD, radiating fiber, etc.) as well as the mode volume of a receiver (photodetector, receiving fiber, etc.) is a constant; however the spatial and angular boundaries of this volume can be traded off subject to the constraint that the total volume remains constant. In the system of this invention, variations of the spatial and angular extent of the mode volume are achieved to enhance the efficiency of coupling.

If the mode volume of the emitting device is equal to or less than that of the receiving device, it is theoretically possible to couple 100% of the power. Such am emitter could have a radiance with spatial extent less than the receiver and angular extent with boundaries greater than the receiver. The arrangement of this invention results in a very high coupling efficiency in such cases, allowing the spatial extent of the emitting device to be exchanged for a solid angle such that all radiant power is within the acceptance angle and spatial extent of the receiving device.

As the coupling occurs by the lens system of this invention, mode mixing is obtained. Thus, power from one mode will be distributed over many modes of the receiving device. This can be used to obtain optimum bandwidth enhancement.

The invention utilizes objective and immersion lenses in providing a highly efficient optical fiber-to-fiber connector that overcomes problems encountered with butt-joint fiber-to-fiber connecting devices. The connector of this invention includes a transparent member, such as a plastic block, in which are formed opposed cavities. The cavities are defined by surfaces of revolution which may be semispherical or aspherical. Within these cavities is an index of refraction material. The ends of the optical fibers to be joined are inserted into the opposed cavities and held in that position. An aligning means causes the fibers to have parallel axes. The fibers are pressed axially into the cavities so that the surfaces of the cavities cooperate with the ends of the fibers to provide a self-centering effect for the fibers, very accurately aligning and positioning the fibers.

In one embodiment the index of refraction of the optical material in the lens cavities is greater than that of the transparent block, causing the light emitted from one fiber to be refracted and transmitted to the other. A very efficient transmission of light results.

In another embodiment, an intermediate lens is included between the objective and immersion lenses.

The intermediate lens may be a field lens with an optical material that has an index of refraction greater than that of the transparent member. In this version, the index of refraction of the transparent member, in turn, is greater than that of the optical material used in the objective and immersion lenses. The transparent member may be split along the plane of the intermediate lens, allowing the mating and unmating of the connector without disturbing the optical fibers at their lenses. The result is better adaptability for field use of the connector.

In some cases more than one intermediate lens may be used and in any event this need not necessarily be a field lens. Variations in ray patterns of the transmitted light to achieve particular results may be achieved through changes in the relationships of the indices of refraction of the transparent member and index of refraction materials.

The invention also provides source-to-fiber coupling and fiber-to-detector coupling. It is capable of efficiently coupling a fiber to a light emitting diode or to a laser diode. In the latter instance and for some light emitting diodes, a tapered waveguide may be used in expanding the spatial extent of the diode radiance to a symmetrical area of circular cross section with azimuthally symmetrical angular distribution, so that a greatly improved coupling efficiency is obtained. Where the mode volume of the source is equal or less than that of the receiving fiber, the lens system of this invention provides an efficient coupling by exchanging spatial boundaries of the emitter radiance for a more desirable solid angle of the radiance field, i.e., with angular boundaries within the acceptance angle of the receiving fiber. Thus, although the mode volume remains constant, the lens system of the invention reshapes this volume to make it compatible with the receiving fiber mode volume.

In cases where the mode volume of the source is greater than the mode volume of the receiving fiber, coupling efficiency is not necessarily enhanced over direct fiber positioning. However, the arrangement of the invention facilitates the alignment of the source and fiber and provides an improved means of making the connection, and so offers substantial advantages over conventional designs.

Similar considerations hold true in coupling the fiber to a detector. Where the area of the detector is of such size that it does not intercept all the rays of the emitting fiber, the lens system of this invention can accomplish a change in the solid angle of the radiance field of the emitting fiber to achieve an efficient coupling. Direct fiber positioning will not achieve efficient coupling for detectors of such proportions. Where the detector area intercepts all the rays of the emitting fiber, such as in the case of a detector having a relatively large area, advantages of aligning and connecting are realized even if coupling efficiency does not exceed that of direct fiber positioning.

DESCRIPTION OF THE PREFERRED EMBODIMENT

The connector 10 shown in FIGS. 1 through 5 utilize an objective-immersion lens combination in joining the individual fibers of cables 11 and 12 which are made up of several fibers each. In the example illustrated, for simplicity, each cable contains three optical fibers, but obviously greater or lesser numbers of fibers may be included in the cables. The individual fibers 13 and 14 of the cables 11 and 12, respectively, extend to opposite parallel end faces 15 and 16 of a transparent coupler block 17 within the connector. The latter member may be made of an acrylic resin or plastic consisting essentially of polymerized methyl methacrylate, marketed under the trademarks Plexiglas and Lucite.

Figure 2:
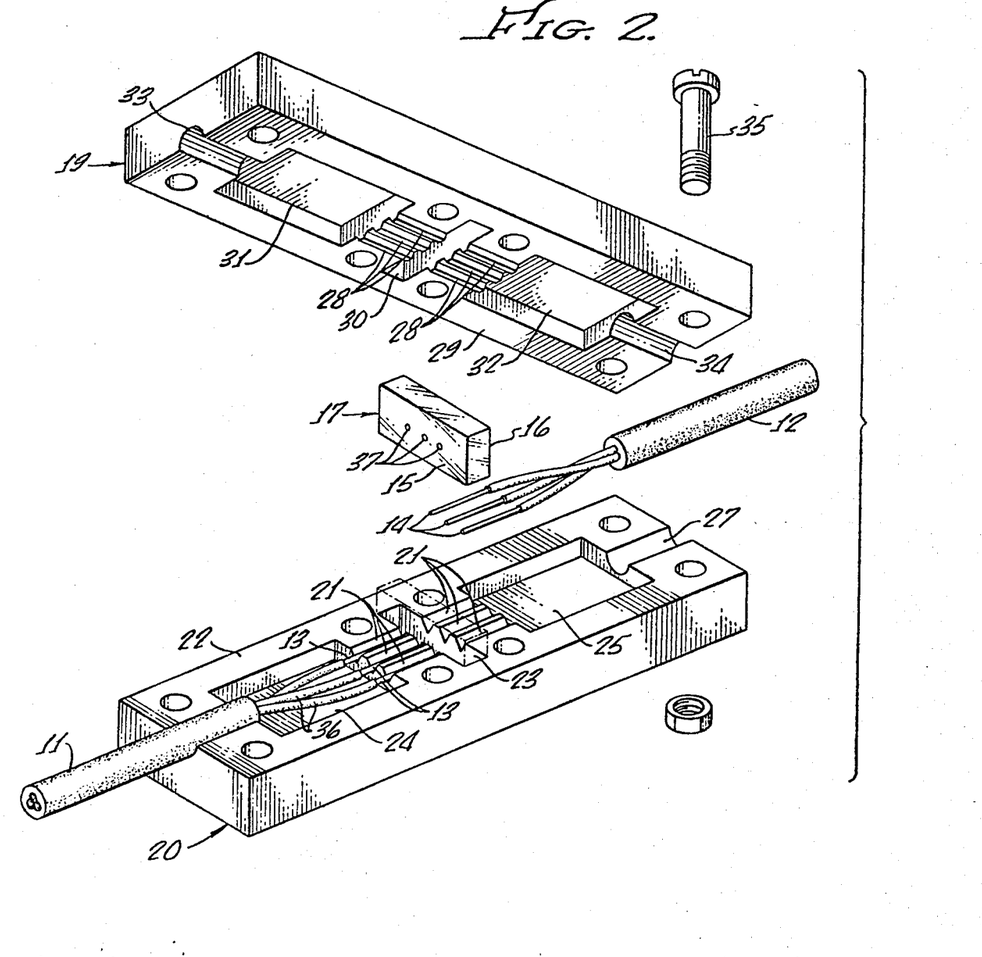
FIG. 2 is an exploded perspective view of the components of the connector.

The fibers 13 and 14 are cylindrical and, as shown, have the same diameter, although the connector can be designed to accommodate fibers of different diameters. Each fiber has a core through which light is transmitted and a circumferential cladding around the core. Either stepped or graded index optical fibers may be used. The optical fibers of the two cables are held in position in an opposed relationship by a suitable means, such as the clamping members 19 and 20 shown, normally of plastic material. The latter member includes parallel V-shaped grooves 21 in the central portion of its upper surface 22. In the middle of the clamping member 20 is a rectangular cavity 23 which is perpendicular to the axes of the grooves 21. Outwardly of the grooves 21 are open chambers 24 and 25 beyond which are semicylindrical grooves 26 and 27.

The other clamping member 19 has ridges 28 protruding from its lower surface 29. The ridges 28 correspond in position and number to the V-grooves 21. A rectangular cavity 30 is perpendicular to the ridges 28 and is at the center of the upper clamping member 19. Chambers 31 and 32, outwardly of the ridges 28, match the chambers 24 and 25 of the lower clamping member 20. Similarly, semicylindrical grooves 33 and 34 are at the outer ends of the member 19.

Figure 1:
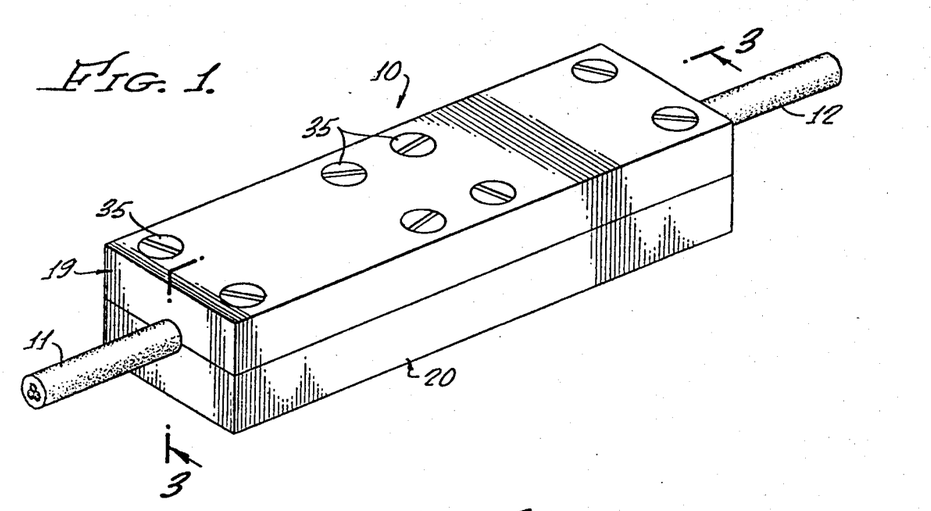
FIG. 1 is a perspective view of a connector made according to this invention.
Figure 3:
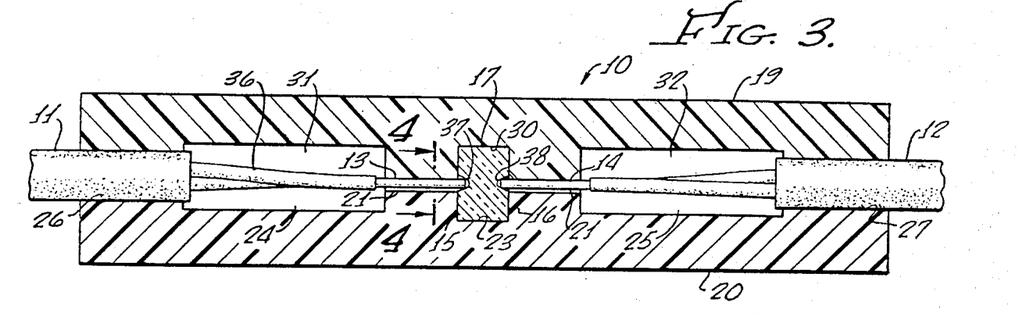
FIG. 3 is a longitudinal sectional view taken along line 3—3 of FIG. 1.
Figure 4:
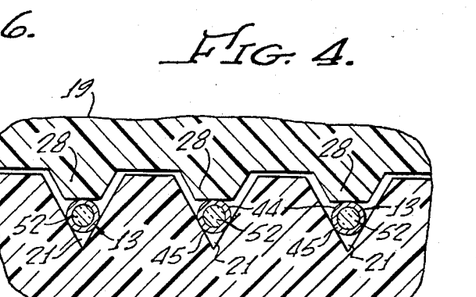
FIG. 4 is an enlarged transverse sectional view taken along line 4—4 of FIG. 3.

When the connector 10 is assembled, the transparent block 17 fits within the two central cavities 23 and 30 of the clamping members, being complementary to these cavities. Bolts 35 hold the clamping members 19 and 20 together with their faces 22 and 29 adjacent, which also clamps the transparent block 17 within the assembly. The optical fibers 13 and 14 are received within the grooves 21 and are engaged by the ridges 28 of the upper clamping member 19. This wedges the fibers 13 and 14 into the V-grooves 21 and securely holds them in place.

The optical fibers 13 are separated from the cable 11 within the combined chambers 24 and 31 of the members 19 and 20. Here the protective layers 36 around the ends of the fibers 13 are removed and the fibers are spread out to enter the grooves 21. The periphery of the cable 11 is clamped between the semicylindrical surfaces 26 and 33. Similarly, the fibers 14 are separated in the combined chambers 25 and 32, while the cable 12 is clamped by the semicylindrical surfaces 27 and 34.

Figure 5:
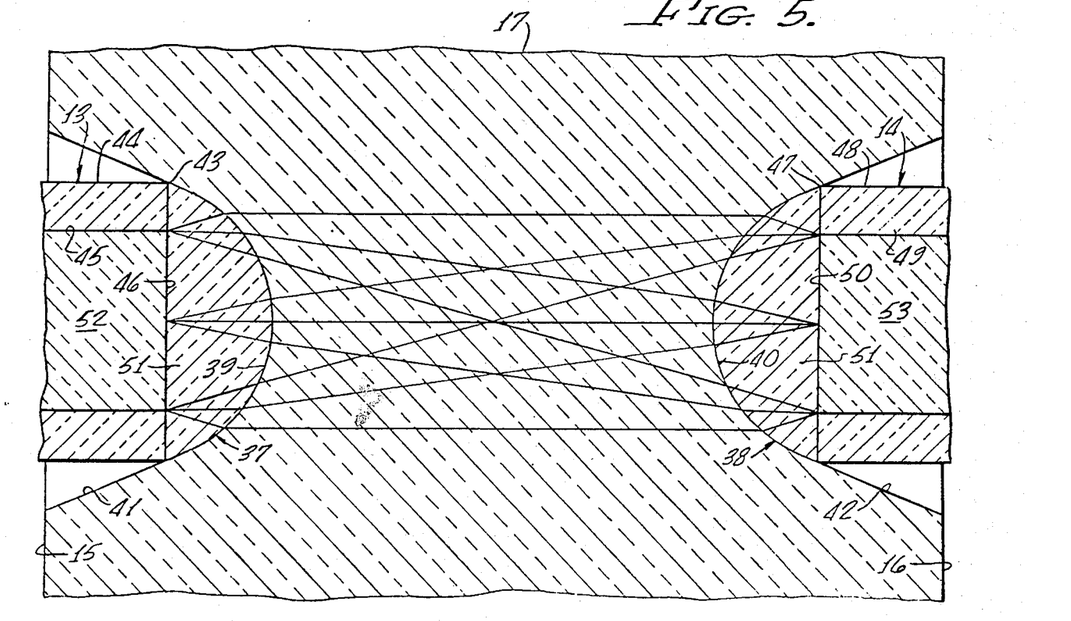
FIG. 5 is an enlarged longitudinal sectional view of the central portion of the connector illustrating the transmission of light from one optical fiber to the other.

Cavities 37 and 38 defined by surfaces of revolution are formed in the opposite faces 15 and 16 of the block 17, one cavity being provided for each of the fibers 13 and 14 within the connector. In the example illustrated, the surfaces 39 and 40, defining the inner portions of the cavities 37 and 38, respectively, are semispherical. Tangential to the surfaces 39 and 40, and extending to the entrances to the cavities 37 and 38, are frustoconical surfaces 41 and 42. Thus, the cavities 37 and 38 taper inwardly. The cavities 37 and 38 are identical in size and shape, and positioned so as to be exactly opposite from each other. In other words, the innermost points of the cavities 37 and 38 (i.e., their apexes) lie along an imaginary straight line that extends through the center of both cavities at the planes of the outer surfaces 15 and 16 of the transparent block 17, i.e., the optical axis of the system. This line also extends through the grooves 21.

The maximum transverse dimensions of the cavities are greater than the diameters of the fibers 13 and 14. This means that the ends of the fibers can be received within the cavities, as shown in FIG. 5. The forward edges of the fibers are brought into engagement with the surfaces of the cavities in making the assembly, either at the semispherical surfaces or close to them. That is to say, the corner 43 of each fiber 13, between the circumferential surface 44 of the outer cladding 45 (which is coaxial with the fiber core) and the flat forward end face 46, is caused to bear against the surface of revolution of one of the cavities 37 in the face 15 of the block 17. This engagement ei*her is along the semispherical surface 39, or along the frustoconical surface 41 adjacent the surface 39. The end face 46 of the fiber 13 is made perpendicular to the fiber axis so there is line contact around the periphery of the fiber at the corner 43. The fiber 13 is pressed axially into the cavity 37, either by hand or otherwise, before being clamped in the grooves 21, which accomplishes a self-centering effect resulting from the engagement of the circular corner 43 with the concave surface of revolution forming the cavity. The engagement of the corner 43 also acially positions the end of the fiber core with respect to the lens surface 39.

Similarly, at the opposite side 16 of the block 17, the corner 47 between the circumferential surface 48 of the cladding 49 and the flat forward end face 50 of the fiber 14 bears against the surface of the cavity 38. This contact is at the semispherical surface 40 or next to that surface at the frustoconical surface 42. The end face 50 is perpendicular to the axis of the fiber 14, and by pressing the fiber 14 axially into the cavity, the enggement of the corner 44 and the cavity surface centers and axially positions the fiber 14. The fiber positioning arrangement provided by the grooves 21 and ridges 28 assists in effectively aligning the fibers 13 and 14 angularly with each other and the cavities. The result is an effective alignment of the fibers 13 and 14 so that, within manufacturing tolerances, they are exactly opposite from each other with their axes lying along the same line. Variations in fiber diameter are compensated for by this precise alignment of their axes.

Within the two sets of cavities is an optical material 51 which may be an index of refraction fluid, gelatin or other material. This material entirely fills the space between the end faces 46 of the fibers 13 and the surfaces of one set of cavities 37, and similarly fills the spaces between the end faces 50 and the surfaces of the opposite cavities 38. When the material 51 is a fluid, surface tension will hold it within the cavity so that it will not run out even if it does not have a high viscosity.

Figure 6:
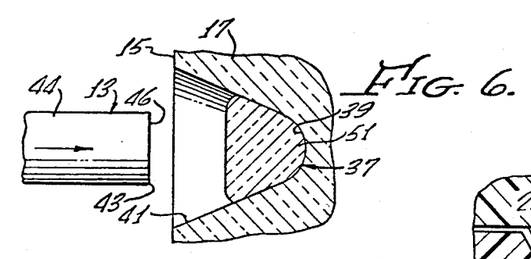
FIG. 6 is a fragmentary sectional view illustrating an initial step in the process of assembling an optical fiber with the transparent member of the device.
Figure 7:
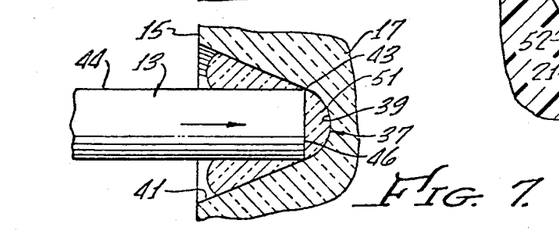
FIG. 7 is a view similar to FIG. 6 showing another step in the process.

In the assembly procedure, when an optical fluid is used, an excess of the fluid 51 first is introduced into the lens cavity, as shown in FIG. 6. After this, the fiber is advanced axially to enter the cavity, which is facilitated by the relatively wide flaring cavity entrance. As the fiber is moved inwardly to engage the cavity surface, as indicated in FIG. 7, excess fluid is displaced from the space between the fiber end and the cavity surface. A significant advantage is realized from the lubrication effects of the fluid, which protects the fiber end face and the cavity surface from being chipped or scratched. Also, the fluid washes off the end of the fiber to improve the connection.

The index of refraction of the optical material 51 bears a predetermined relationship to the index of refraction of the transparent block 17. In the connector of FIGS. 1 through 5, the index of refraction of the optical material 51 is greater than that of the block 17 in order to refract the light emitted from one optical fiber so that it will be received by the other.

In this example, the fiber 13 is the emitting fiber and the fiber 14 the receiving fiber. The rays emanating from the core 52 of the fiber 13 are refracted inwardly at the semispherical surface 39 of the objective lens, directing the rays toward the immersion lens where they again are refracted at the semispherical surface 40. Nearly all of the emitted rays impinge on the end of the fiber 14 such that they are received in its core 53 at the end face 50.

The frustoconical surfaces 41 and 42 serve only as the entrances to the cavities 37 and 38, not as the lens surfaces. It is for this reason that the parts are proportioned such that the corners 43 and 47 of the fibers 13 and 14 engage either the semispherical surfaces 39 and 40 or are close to those surfaces. This causes the rays emitted by the core of the fiber 13 and received by the fiber 14 to be refracted by the semispherical lens surfaces 39 and 40. Entrance of the fibers into the lens cavities and properly positioning their end faces with respect to the lens surfaces are facilitated by giving a 30° cone angle to the frustoconical surfaces 41 and 42 (i.e., each of the surfaces 41 and 42 is at a 30° angle with respect to the axis of its cavity).

The radiance characteristics of the emitting fiber and the acceptance characteristics of the receiving fiber form the basis for the selection of the radius of the lens cavities, the index of refraction of the optical material of the lenses, and the index of refraction of the transparent coupler block. Polymerized methyl methacrylate is especially suitable for the transparent block 17 because of its properties, including the ability to be molded to form lens cavities of precise shapes. When this material is selected, the index of refraction of the transparent block is determined, so that lens surface curvatures, index of refraction material indices, lens apex to apex separation and fiber end face to lens apex separation become the variables. These variables allow the designer to select values to suit conditions so that the connector can be manufactured most economically without sacrificing efficiency. A lens cavity of relatively small curvature requires an index of refraction material of relatively high index of refraction. Conversely, use of an index of refraction material of relatively low index of refraction means that the lens surface curvature must be higher. An increase in the index of refraction of the lens fluid results in a decrease in lens apex to apex separation.

In a typical example for connecting step index optical fibers of 0.16 numerical aperture, with a methyl methacrylate coupler block having an index of refraction of 1.484, the following data will apply:

fiber outside diameter 125 microns
fiber core diameter 85 microns
lens surface radius 70 microns
lens fluid index of refraction 1.695
separation of cavities 329 microns
fiber end face to lens apex separation 42.5 microns Alignment of the innermost points of the cavities in the transverse direction is the most sensitive criterion in the connector construction. This can be controlled through precision-forming of the transparent block and its cavities. The sensitivity to axial alignment is not as great as for transverse offset. In the system shown, end separation of the fibers may be varied within limits without much effect upon losses in the connector. Losses from Fresnel reflection are considerably less than in connectors where the fibers are joined by butt connections without an index of refraction fluid.

The data presented in the above example are based upon the characterization of the mode volume of the fiber. The mode volume is related to the index profile, the core diameter and the numerical aperture of the fiber. These characteristics, considered in conjunction with the effects of diffraction and abberation of the total system, are used to determine the parameters that will allow optimal coupling efficiency.

Abberation and diffraction have the effect of blurring the idealized far field ray bundles impinging on the core 53 of the receiving fiber 14 in FIG. 5. This causes light rays which impinge near the edge of the core 53 of the receiving fiber 14 to spread into the cladding 49 and be lost to the system. Similarly, light rays from far-field ray bundles which impinge on the core 53 can be spread such that their impingement angle may be outside the acceptance angle of the fiber at the point of impingement. Light loss from such abberation and diffraction may be minimized by variations in the curvature of the lens surfaces, apex separation, and indices of refraction, with knowledge of the emitting fiber radiance and receiving fiber acceptance characteristics.

Figure 8:
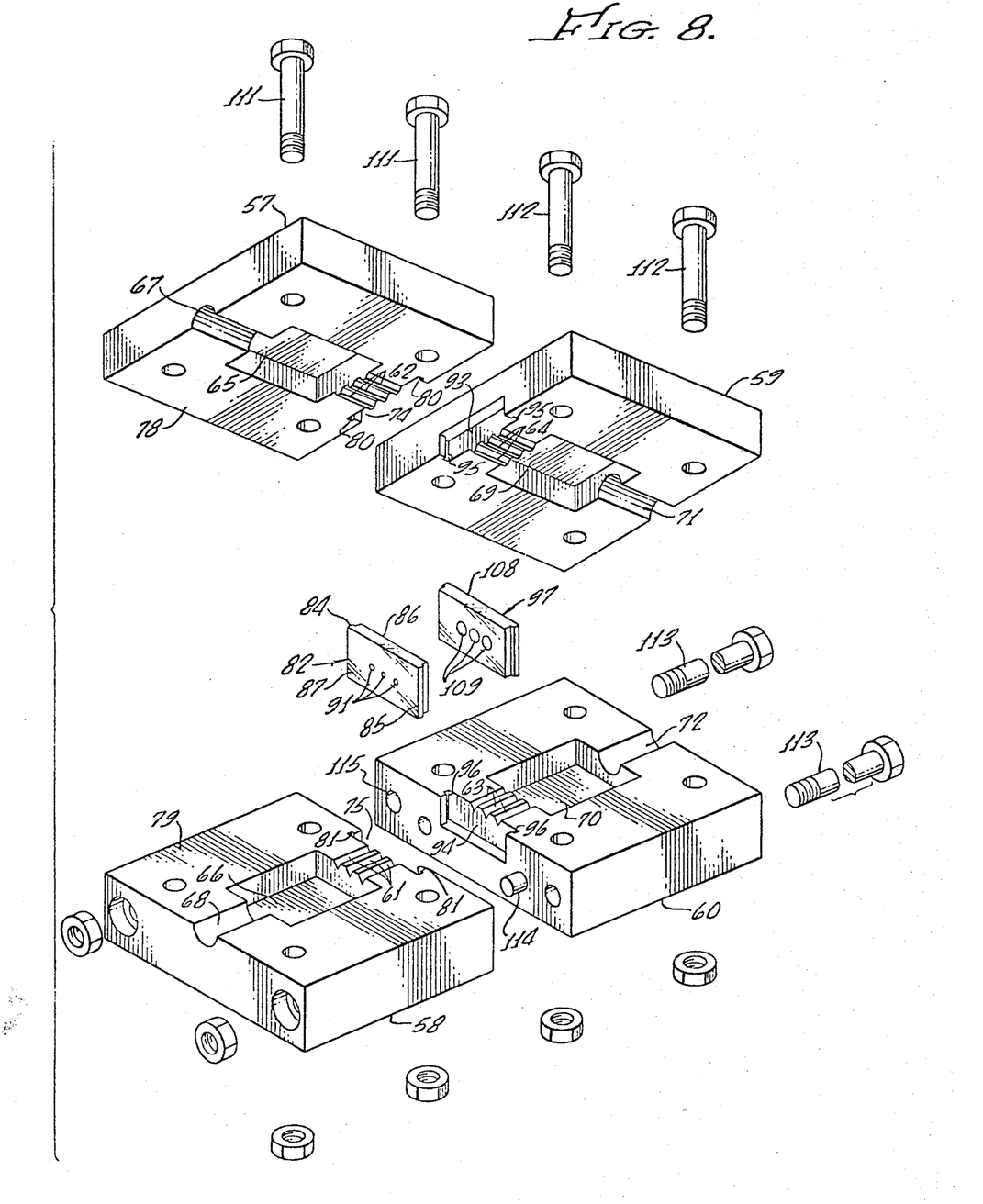
FIG. 8 is an exploded perspective view of a modified form of the invention.
Figure 9:
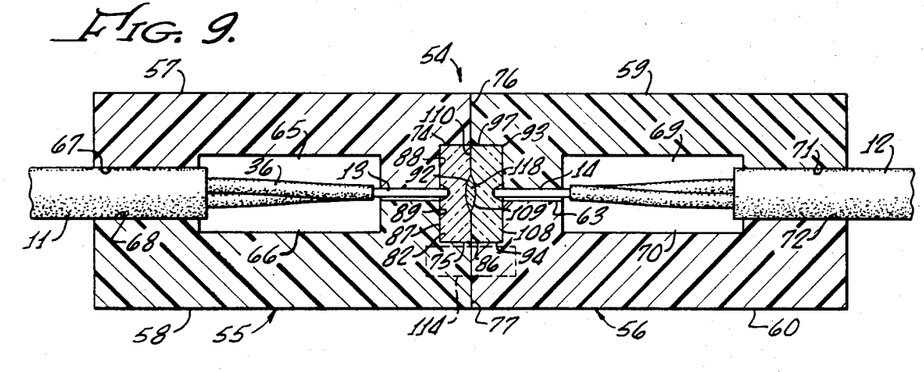
FIG. 9 is a longitudinal sectional view of the connector of FIG. 8 in the assembled position.
Figure 10:
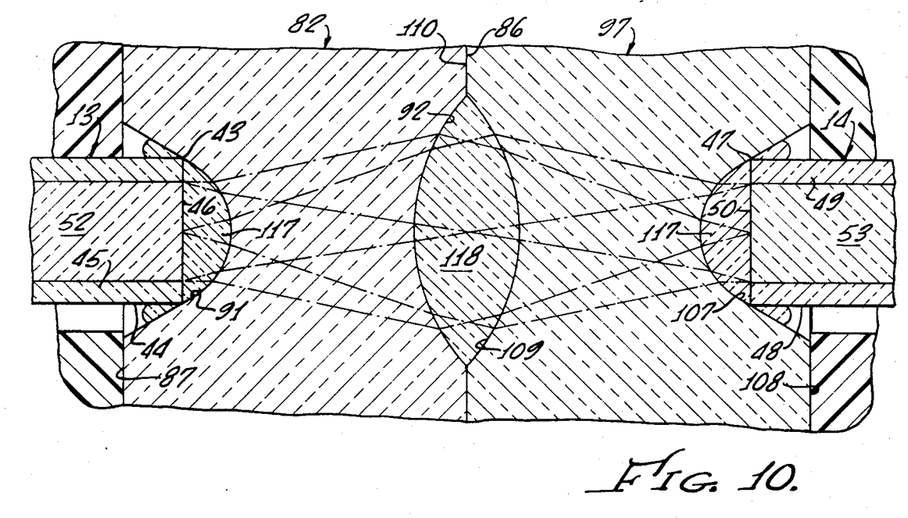
FIG. 10 is an enlarged longitudinal sectional view of the central portion of the connector of FIG. 9.

An intermediate lens is interposed between the objective and immersion lenses in the arrangement shown in FIGS. 8 through 10. In this example, the intermediate lens is a field lens. The inclusion of an intermediate lens allows the connector to be constructed so as to be separable at its center, so that the optical fibers are not disturbed at the objective and immersion lenses upon mating and unmating of the connector. It also allows greater spacing between the ends of the fibers, which facilitates manufacture of the connector. This connector is not as sensitive to transverse cavity alignment as the previously described embodiment, due to having a larger beam area at the field lens. Axial alignment of the fibers, however, is critical.

The connector 54 includes two main sections 55 and 56, each of which includes two clamping members. These are the clamping members 57 and 58 for the section 55, on the left as the connector is shown, and identical clamping members 59 and 60 for the right-hand section 56. These clamping members are generally similar to the clamping members 19 and 20 of the connector 10. That is to say, there are V-shaped grooves 61 in the lower clamping member 58 with matching ridges 62 in the upper clamping member 57. These will hold the optical fibers as in the previously described connector. The other portion 56 of the connector 54 is similar, with the grooves 63 in the lower clamping member 60 and matching ridges 64 in the upper clamping member 59.

Chambers 65 and 66 are provided in the members 57 and 58 of the connector section 55, providing a space where the fibers are separated from the cable and directed to the V-shaped grooves 61. Semicylindrical surfaces 67 and 68, outwardly of the chambers 65 and 66, engage the cable as it enters the connector. Similarly, the members 59 and 60 of the other connector section 56 have chambers 69 and 70, as well as semicylindrical surfaces 71 and 72 at their outer ends.

Recesses 74 and 75 are formed in the flat forward faces 76 and 77 of the members 57 and 58, respectively, of the connector section 55. These recesses also extend inwardly from the adjacent faces 78 and 79 of the members 57 and 58 which are in adjacency in the assembled connector. The two recesses 74 and 75 include undercut portions 80 and 81 at their inner corners, extending parallel to the forward faces 76 and 77, respectively. This enables the pair of clamping members 57 and 58, when assembled, to retain a transparent block 82, which may be made of methyl methacrylate. The latter member includes rearward flanges 84 and 85 along its side edges which fit within the undercut portions 80 and 81. The periphery of the transparent block 82 is complementary to the confines of the cavity formed by the combined recesses 74 and 75, so that it is securely held against movement by the assembled members 57 and 58, and accurately positioned relative to the grooves where the optical fibers rest. The forward face 86 of the transparent block 82 is flush with the forward faces 76 and 77 of the members 57 and 58. The rearward face 87 of the transparent block 82 bears against the flat inner surfaces 88 and 89 of the cavities 74 and 75, respectively. The forward and rearward block faces 86 and 87 are perpendicular to the longitudinal axes of the V-shaped grooves 61.

In the rearward face 87 of the block 82 are cavities defined by surfaces of revolution 91 for the objective lenses in the assembled connector. In the forward face 86 are cavities also formed by surfaces of revolution 92 and of greater diameter than that of the cavities of the objective lenses. The surfaces 92 form the surfaces for one-half of the field lenses of the mated connector. There is a surface 92 opposite each of the rearward lens surfaces 91.

The other half 56 of the connector is identical to the connector section 55 and includes recesses 93 and 94 with undercut portions 95 and 96 for holding a transparent block 97.

There are cavities defined by surfaces of revolution 107 in the rearward face 108 of the block 97 for use in forming the immersion lenses of the connector. Surfaces of revolution 109 in the forward face 110 of the transparent block 97 are used as the boundaries of the field lenses of the assembly.

Bolts 111 hold the two members 57 and 58 of the connector section 55 together, and bolts 112 similarly secure the members 59 and 60 of the section 56. Longitudinal bolts 113 extend through the connector sections 55 and 56 to secure the connector in the mated position. Each connector section includes a pin 114 projecting from one side of its forward face and a matching opening 115 in the other side. When the connector is mated, the pins 114 enter the openings 115 to align the sections 55 and 56. For disassembly of the connector sections 55 and 56, the bolts 113 are loosened so that separation occurs at the center of the connector and not at the locations where the optical fibers enter the objective and immersion lenses. Thus, the fibers need not be disturbed or exposed as the connector is mated and unmated.

As before, an index of refraction material, such as an optical fluid, is used in the lenses. The material 117 in the objective and immersion lenses, in the example shown, has an index of refraction that is less than the index of refraction of the transparent blocks 82 and 97, which have the same index of refraction. A different optical material 118 is in the field lens cavity, and this material has an index of refraction which is greater than that of the transparent blocks 82 and 97. As a result of these indices of refraction, there is a ray pattern such as indicated in FIG. 10. The light rays emitted from a fiber 13 at the objective lens are diverged at the surface 91 by virtue of the differences in the indices of refraction of the fluid 117 and that of the transparent block 82. These light rays are received by the field lens with its relatively large diameter. The field lens, in turn, directs the light rays upon the immersion lens, where they are refracted so as to be received within the core 53 of the fiber 14.

Many variations in lens design and indices of refraction of the system components are possible to achieve particular results.

Figure 11:
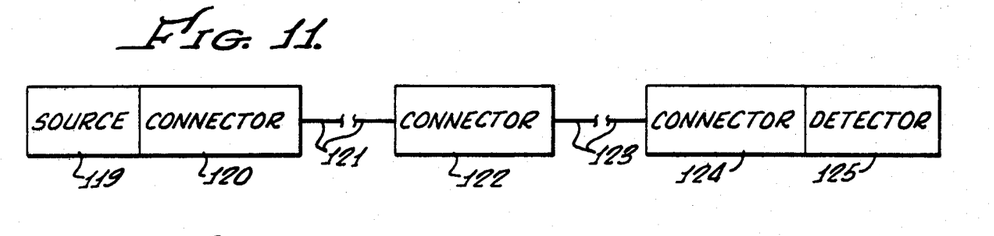
FIG. 11 is a schematic view of an optical system utilizing the arrangement of this invention.

The techniques of this invention may be utilized in source-to-fiber coupling and fiber-to-detector coupling, as well as in fiber-to-fiber coupling. A system of this type, as shown schematically in FIG. 11, includes a light source 119, joined by a connector 120 to an optical fiber 121, which receives light emitted by the source. A connector 122 in the system, which may be similar to the connector 10 or the connector 54 described above, allows light from the fiber 121 to enter receiving fiber 123. An additional connector 124 causes the light from the fiber 123 to be received by a detector 125, which forms the output of the system.

Figures 12, 13:
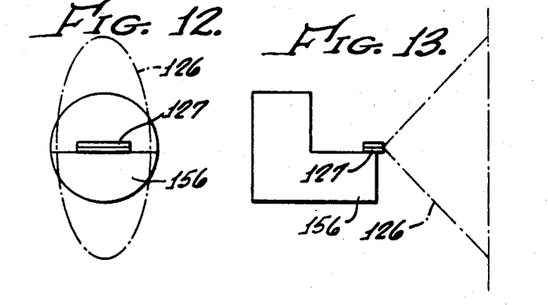
FIGS. 12, 13, and 14 are a front elevation, a side elevation, and a top plan view, respectively, of a laser diode, illustrating its emittance pattern.
Figure 14:
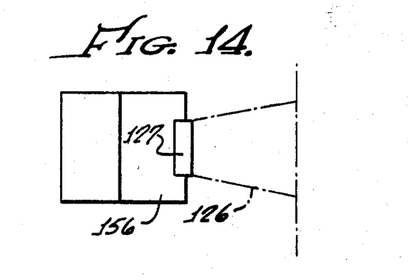

The use of a laser diode for the light source 119 offers attractive possibilities because of its relatively high power, its monochromatic characteristics and the ease with which it can be modulated. A problem arises, however, from the fact that a typical laser diode produces an elliptical beam, as shown schematically in FIGS. 12, 13, and 14. The beam 126, emitted by such a laser diode 127, has a large divergence in a direction perpendicular to the longitudinal dimension of the laser diode's stripe emitting area. Usually the stripe emitting area of the laser diode is much smaller than the core area of a multimode fiber. Ordinary coupling designs will not efficiently couple a laser diode to a multimode fiber, which has a conical acceptance pattern of less divergence than that of the beam of the laser diode. Even butting the end of the fiber against the laser diode does not alleviate the inefficient coupling because the extremely divergent emitted rays will not couple to the fiber. The lens technique of this invention, however, provides a simplified connection with vastly improved efficiency.

Figure 15:
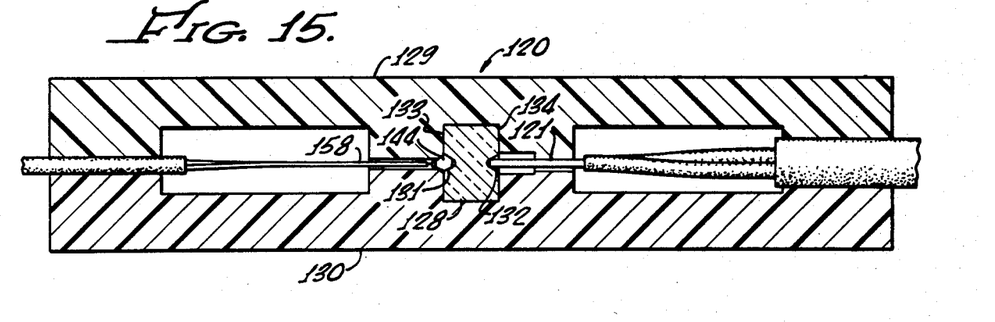
FIG. 15 is a longitudinal sectional view of a connector for coupling a laser diode to a receiving fiber.
Figures 16, 19:
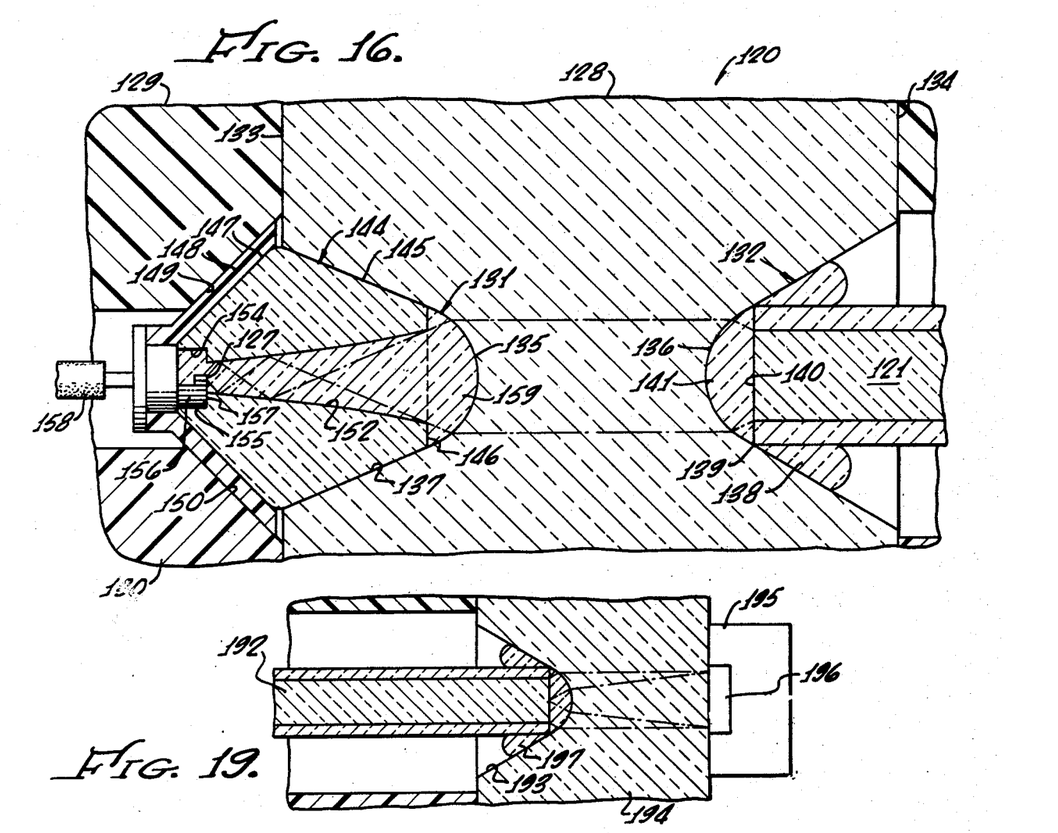
FIG. 16 is an enlarged sectional view of the central portion of the connector of FIG. 15.
FIG. 19 is a fragmentary sectional view illustrating the connection of an optical fiber to a small area detector.

The connector 120, shown in FIG. 15 and in enlarged fragmentary cross section in FIG. 16, includes a transparent coupler block 128 which may be made of plastic or glass similar to the coupler blocks for the embodiments described above. The coupler block 128 may be held within the connector by means of clamping members 129 and 130, which are recessed to receive it and are held together suitably, such as in the arrangements described above. Within the coupler block 128 are opposed cavities 131 and 132 formed in its opposite flat end surfaces 133 and 134, respectively. The cavities 131 and 132 are defined by surfaces of revolution and include inner end portions 135 and 136 defined by spherical segments, with frustoconical entrances 137 and 138, respectively.

The fiber 121 extends into the cavity 132 with its end corner 139 bearing against the cavity surface. The fiber 121 is pressed axially into the cavity 132 and gripped by the members 129 and 130 so that the fiber continues to exert an axial force against the cavity surface and a centering effect is accomplished. This precisely aligns the axis of the fiber 121 with the axis of the cavity 132. Filling the space between the end face 140 of the fiber 121, and the wall of the cavity 132, is an optically transparent material 141, such as an index of refraction fluid. The index of refraction of this fluid is chosen so as to cause the beam to be refracted properly at the surface 136 to optimally power into the fiber 121.

Within the cavity 131 is a plug 144 of transparent material such as plastic or glass having a forward outer surface 145 that complementarily engages the frustoconical surface 137 of the cavity 131 and terminates at a transverse end face 146. At the rearward end of the plug 144 is a tapered surface 147 which is frustoconical in shape and at its shape edge meets the outer perimeter of the forward surface 145. A gasket 148 of a resilient elastomer or similar material fits over the rearward end surface 147. On the outside of the gasket 148 the clamping members 129 and 130 present tapered surfaces 149 and 150, which are parallel to the surface 147 of the plug 144. Therefore, when the connector 120 is assembled, the clamping members 129 and 130 react through the gasket 148 to bias the plug 144 inwardly relative to the cavity 131. This assures engagement of the plug surface 145 with the cavity surface 137. With these two engaging surfaces being tapered, the plug 144 is centered and aligned relative to the cavity 131 as the connector is assembed.

Along the axis of the plug 144 is an opening 152 of circular cross section, which extends inwardly from the forward end face 146 to an inner end near the rearward portion of the plug 144. The opening 152 is tapered, diverging toward the end face 146.

An additional opening 154, which may be cylindrical and which is axially aligned with the opening 152, extends inwardly from the rearward end of the plug 144, being of a larger diameter than the inner end of the opening 152. Consequently, the opening 154 terminates at a shoulder 155 where it connects to the opening 152. Complementarily received in the opening 154 is a support block 156, the forward end 157 of which bears against the shoulder 155. Carried by the support block 156 at its forward end 157 is the laser diode 127. The laser diode 127 is centered with respect to the forward face 157 of the support block 156, and, consequently, is centered with respect to the tapered opening 152. The electrical lead 158 for the laser diode extends rearwardly through the connector away from the support 156.

Within the opening 152 and within the cavity 131 forwardly of the plug 144, is an optical material 159, such as an index of refraction fluid. This fluid engages the laser diode 127 and entirely fills the space within the opening 152 forwardly of the laser diode and within the cavity 131 as well.

The opening 152 acts as a tapered waveguide, which causes the spatial extent of the laser diode radiance to become expanded in return for less angular divergence. The effective launch area is converted to a circular cross section with an axially symmetrical divergence pattern. The index of refraction of the fluid 159 and of the plug 144 are selected so as to cause the light from the laser diode 127 to experience total internal reflection along the wall of the opening 152 as it travels the length of this opening. By making the waveguide opening 152 sufficiently long and with optimum taper, mixing of the light will be achieved as the light is reflected repeatedly from the laser diode source to the forward end. This enables optimum radiance distribution to be obtained at the emitting end of the tapered waveguide, based upon the parameters of the receiving fiber, such as index profile, core size, and the numerical aperture. The angular distribution of the beam as it emerges at the end surface 146 is changed so that the large divergent characteristic of the laser diode radiance distribution no longer exists. In exchange, the emitting area is larger. The beam angle has less divergence relative to the optical axis (the axis of the waveguide 152 and the cavity 131) and so can be transmitted to the receiving fiber more efficiently.

In accomplishing these objectives, the plug 144 that defines the waveguide opening 152 may be of methyl methacrylate material having an index of refraction of around 1.484 for light having a wavelength of 0.83 microns. The fluid 159 in the waveguide then may have an index of refraction of approximately 1.789. The length of the opening 152, to accomplish appropriate mixing, may be in the neighborhood of 15 times the diameter of the opening at its narrow (input) end or greater.

From this point onward the system acts essentially as the connector arrangement described above. That is to say, the cavity 131 acts as an objective lens, with the light being refracted at the semispherical lens surface 135 and transmitted through the transparent block 128 to the opposite lens cavity 132. There the cavity has the effect of an immersion lens receiving the light and refracting it for being received in the core of the fiber 121.

The index of refraction fluid 159 not only results in total reflection in the tapered waveguide, but also acts as the material in the cavity 131 to accomplish the necessary refraction at the lens surface 135. The index of refraction of the material 159 is not necessarily the same as that of the material 141 of the immersion lens for the fiber 121. Also, the radius of the semispherical section 135 of the lens for the source need not be the same as the radius of the lens surface 136 for the fiber 121. In addition, the exit area of the waveguide 152 may be different from that of the core of the receiving fiber 121.

A light emitting diode of the edge emitting type has a stripe emitting area which produces an elliptical beam generally similar to that of a laser diode. The emitting area of such an LED may be larger than that of a laser diode, but nevertheless smaller than the core area of a multimode optical fiber. Accordingly, the same approach is used in coupling an edge emitting LED to an optical fiber in accordance with this invention as that described above for the connection of a laser diode.

When the light source for the optical system is a surface emitting light emitting diode, usually its area and emittance angle are such that its mode volume is greater than the mode volume of the receiving fiber. The lens system of this invention is useful with such light sources as a convenient means for connecting the source and fiber and as an alignment medium. This enables the fiber to be aligned properly in the radiance field to obtain optimum coupling to the LED.

Figure 17:
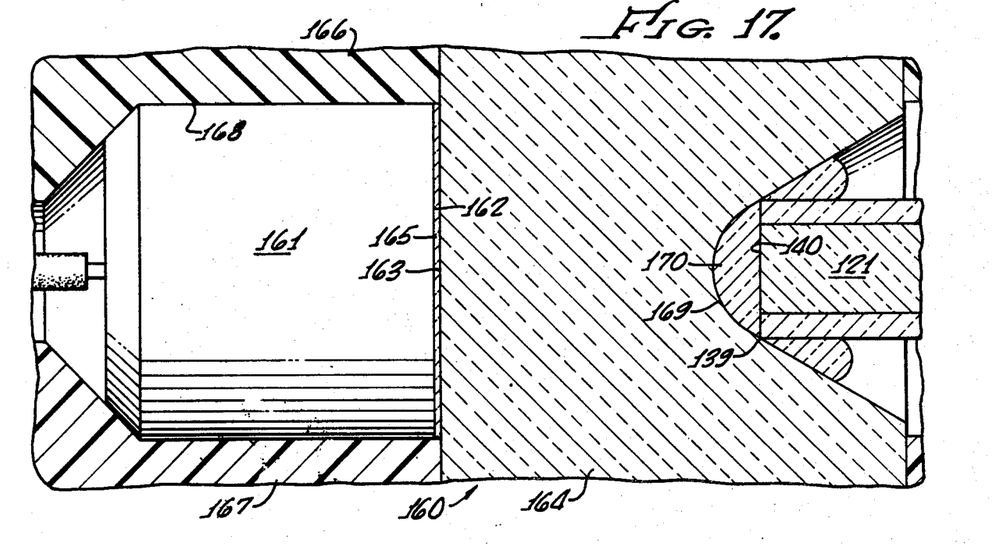
FIG. 17 is an enlarged sectional view illustrating an arrangement for connecting a light emitting diode to a fiber.

The connector 160 of FIG. 17 is for such an arrangement, to connect a surface emitting LED 161 to the fiber 121. The forward face 162 of the LED is positioned adjacent the flat surface 163 of a transparent block 164 of plastic or glass. A matching optical material 165, such as an index of refraction fluid, is interposed between the faces 162 and 163. The two clamping members 166 and 167 of the connector collectively define a recess 168, which receives and positions the LED 161. At the opposite end, the fiber 121 is pressed axially into a cavity 169 that is similar to the previously described cavities and aligned with the LED 161. An optical material, such as an index of refraction fluid 170, is included in the cavity 169 beyond the fiber end. In this arrangement the fluid 170 may have the same index of refraction as that of the transparent block 164. Accordingly, there is no actual lens effect at the cavity 169, which acts as an aligning means and a simplified connecting arrangement rather than a lens in this design.

Figure 18:
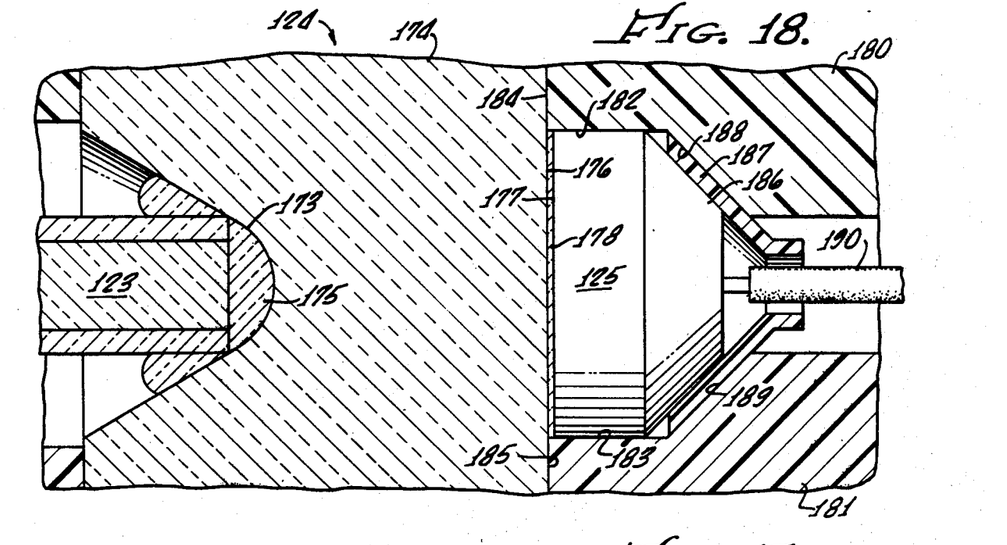
FIG. 18 is an enlarged sectional view illustrating the coupling of a fiber to a detector.

The connector 124 for joining the fiber 123 to the detector 125, shown in FIG. 18, includes a lens cavity 173 in a transparent block 174, as in the previously described embodiments, providing the primary function of aligning the fiber 123 with the detector 125. In this instance, the detector 125 has a relatively large area, somewhat greater than that of the core of the emitting fiber 123. An optical material, such as an index of refraction fluid 175, is included in the lens cavity 173, filling the space between the end of the fiber 123 and the wall of the cavity. The fiber 123 is forced axially into the cavity 173 to thereby align the axis of the fiber 123 with that of the cavity 173.

At the opposite end, the transparent block 174 has a flat face 176. The flat forward surface 177 of the detector window is adjacent the surface 177 with a matching fluid 178 interposed between the surface 177 of the block and the surface 178 of the detector. This reduces Fresnel losses between the block 174 and the detector 125.

The two clamping blocks 180 and 181 of the connector 124, which may be similar to the clamping blocks previously described in the other connectors of this invention, have recesses 182 and 183 in their forward ends 184 and 185, respectively. These complementarily receive the perimeter of the detector 125. In order to assure that the detector 125 is firmly thrust against the block 174, a frustoconical end portion 186 is provided on it, engaged by a similarly shaped gasket 187. Tapered surface 188 and 189, having the same angle as the tapered portion 186 of the detector 125, provide a force through the gasket 187 which presses the detector 125 against the end face 176 of the block 174. The recesses in the blocks 180 and 181 are formed in precise alignment with the cavity 177 so that the fiber 123 is aligned with the detector 125. The electrical lead 190 for the detector 125 extends rearwardly away from the detector and between the clamping members 180 and 181. Consequently, the connector 124 not only provides a convenient means for connecting the fiber 123 to the detector, but also through the alignment of the fiber and detector assures that all of the light radiated from the fiber impinges on the detector. Improved efficiency results.

For a small area detector, such as one of an area comparable to the emitting fiber core area or less, the system is designed to produce a lens effect to cause the light from the fiber to impinge upon the detector. Such a device is illustrated in FIG. 19 where a fiber 192 is received in a cavity 193 in a transparent block 194, biased axially toward the cavity surface so that the fiber is centered in the cavity. Opposite the cavity 193, positioned by a support 195, is the detector 196. The contour of the cavity, the index of refraction of the fluid 197 within the cavity and the index of refraction of the member 194 are selected so that substantially all of the light emitted from the fiber core is refracted at the lens surface and transmitted to the detector 196.

In some instances a ferrule or collar may be positioned around the end portion of the fiber and brought into engagement with the lens cavity surface rather than the corner of the fiber. This may occur, for example, where a plastic clad fiber is being coupled because it is necessary to remove the cladding to break the fiber to form the flat, perpendicular end surface suitable for coupling.

Figure 20:
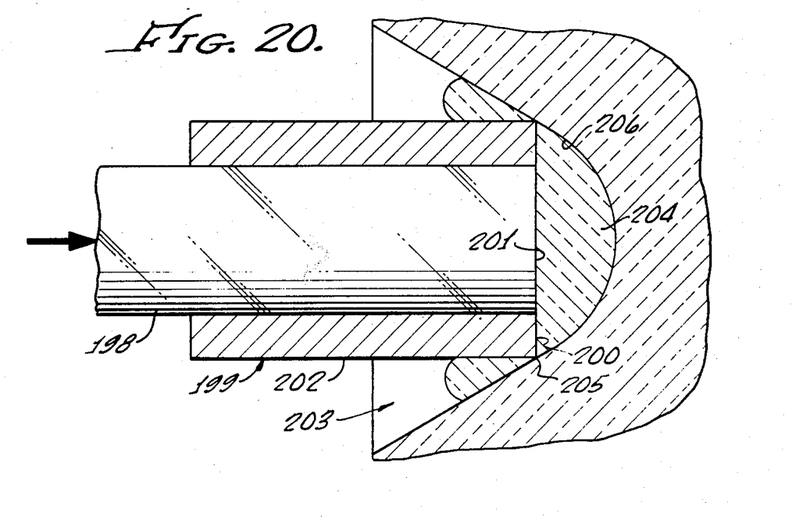
FIG. 20 is an enlarged fragmentary sectional view illustrating the connection of a fiber into the lens system where the fiber is provided with a ferrule around its end portion.

FIG. 20 illustrates a fiber 198 having a ferrule 199 around its end portion. The ferrule 199 is tubular with a flat forward end surface 200 perpendicular to its axis and aligned with the end face 201 of the fiber 198. The circumferential surface 202 of the ferrule is coaxial with the fiber. This forms an optical fiber unit which is associated with the connecting device in the same way as the fibers described above. The assembly of the ferrule 199 and fiber 198 is pressed axially into the lens cavity 203, displacing the excess index of refraction fluid 204. The forward corner 205 of the ferrule, between its end surface 200 and its outer circumferential surface 202, is brought into engagement with the surface 206 of the cavity. This causes the axis of the fiber 198 to become aligned precisely with the axis of the lens cavity 203, and accurately spaces the fiber end face 201 with respect to the lens surface and its apex.

The part of the ferrule that engages the cavity surface is not necessarily a continuous 90° corner surface such as the corner 205 illustrated, as a tapered surface may be provided to mate with the lens cavity entrance or other configuration may be given to the forward end of the ferrule. The important consideration is to provide an abutment which has the fiber axis as its center so that it will center and position the fiber as the fiber is biased axially into the cavity and the abutment bears against the surface of revolution that forms the cavity. The corner 205 forms such an abutment because it is defined by the intersection of the outer surface 202 of the ferrule, which is coaxial with the fiber 198, and the end face 200 of the ferrule, which is perpendicular to the fiber axis. The abutment surface may be segmented, rather than continuous, and it will still perform its function.

A ferrule may be used on a clad fiber end although normally it is superfluous under that circumstance and so is omitted.

In addition, an unclad fiber may bear directly against the cavity surface at its forward end corner, with no ferrule around it. Again, the fiber is pressed axially into the cavity and an index of refraction material fills the space beyond the fiber end.

The foregoing detailed description is to be clearly understood as given by way of illustration and example only, the spirit and scope of this invention being limited solely by the appended claims.

I claim:
1. A device for interconnecting a duality of substantially cylindrical optical fibers comprising,
   means defining a cavity having a tapered surface a portion of which comprises
      an objective lens,
      means for positioning an optical fiber unit having an outer surface, an end surface, and a corner between said end surface and said outer surface, said means for positioning including means for pressing said corner against said tapered surface for aligning the axis of said fiber unit and the axis of said cavity so that light emitted from said optical fiber unit is received and refracted by said objective lens,
   a light-transmissive means for transmitting light so refracted by said objective lens,
   means defining a second cavity having a tapered surface a portion of which comprises
      an immersion lens for receiving and refracting said light from said light-transmissive means, and means for positioning a second optical fiber unit having an outer surface, an end surface, and a corner between said end surface and said outer surface, said second means for positioning including means for pressing said corner of said second fiber unit against said tapered surface of said second cavity for aligning the axis of said second fiber unit and the axis of said second cavity so that said second fiber unit can receive said light so received and refracted by said immersion lens.

2. A device as recited in claim 1 in which said objective lens and said immersion lens are fluid lenses.

3. A device as recited in claim 1 in which each of said lenses includes a surface of revolution forming a cavity in said light-transmissive means, and an optical material of predetermined index of refraction in said cavity.

4. A device as recited in claim 3 in which said light-transmissive means is a transparent member of predetermined index of refraction.

5. A device as recited in claim 4 in which said index of refraction of said optical material is greater than said index of refraction of said transparent member.

6. In combination with a duality of cylindrical optical fibers each of which has an end face and an end abutment, a device for connecting said fibers for transmitting light from one to the other comprising, a light-transmissive means, and lens means at opposite locations relative to said light-transmissive means, each lens means including a surface forming a cavity having a tapered potion, each of said optical fibers having said end face thereof received in one of said cavities with said end abutment thereof pressed against said tapered portion of the one of said cavities receiving the same, and an index of refraction material in each of said cavities between said end face of said optical fiber therein and said surface of said cavity, the index of refraction of said index of refraction material and the index of refraction of said light-transmissive means being of predetermined values such that light emitted from said end face of one of said optical fibers is refracted by one of said lens means, transmitted through said light-transmissive means and refracted by the other of said lens means so as to impinge upon said end face of the other of said optical fibers.

7. In combination with a duality of cylindrical optical fibers of substantially the same diameter each of which has a substantially flat end face substantially perpendicular to the axis thereof, a device for connecting said fibers for transmitting light from one to the other comprising, a light-transmissive member having opposite sides, and lens means at said opposite sides of said light-transmissive member for forming an optical system therewith, each lens means including, a surface of revolution forming a cavity having a tapered portion, the innermost points of said cavities being on a straight line that represents the optical axis of said system, said cavities being substantially the same size, one of said optical fibers being received in each of said cavities with the axis thereof substantially aligned with said optical axis, and the edge of each of said fibers between the circumferential surface and said end face thereof engaging said tapered portion of the cavity receiving the same for so aligning said axis of said fiber with said optical axis, with said end face thereof being spaced from said surface of revolution, and an optical material in each of said cavities substantially entirely filling the space between said end face of said optical fiber therein and said surface of revolution thereof, the index of refraction of said optical material and the index of refraction of said light-transmissive member being of predetermined values such that substantially all light emitted from said end face of one of said optical fibers is refracted by one of said lens means, transmitted through said light-transmissive member and refracted by the other of said lens means so as to be received in the other of said optical fibers.

8. A device as recited in claim 7 in which said opposite sides are defined by substantially parallel planar surfaces.

9. A device as recited in claim 7 including in addition means for aligning the axis of each of said optical fibers with the one of said cavities receiving the same, and for holding said optical fibers with their ends so received in said cavities.

10. A device as recited in claim 7 in which said surface of revolution of at least one of said lens means is a segment of a sphere.

11. A device as recited in claim 7 in which said surface of revolution of at least one of said lens means is an aspherical surface.

12. A device as recited in claim 7 in which the index of refraction of said optical material is greater than the index of refraction of said light-transmissive member.

13. A device as recited in claim 12 in which said index of refraction of said optical material is around 1.695.

14. A device as recited in claim 12 in which said index of refraction of said optical material is around 1.695, and said light-transmissive member is made of plastic having an index of refraction of around 1.484.

15. A device as recited in claim 7 in which said optical material is a fluid.

16. A device as recited in claim 7 in which said light-transmissive member consists essentially of polymerized methyl methacrylate.

17. A device as recited in claim 7 in which
at least one of said cavities includes,
an inner portion of predetermined curvature for forming a lens surface, and an outer portion of a different curvature diverging outwardly from said inner portion for forming an entrance to said one cavity.

18. A device as recited in claim 7 in which said edge of the one of said fibers received in said one cavity is sufficiently close to said inner portion of said one cavity to cause said inner portion to provide the lens surface for substantially all of the light transmitted by said one fiber.

19. A device as recited in claim 7 including in addition a third lens intermediate said lenses in said light-transmissive member, said third lens directing light from one of said lenses to the other of said lenses.

20. A device as recited in claim 19 in which said light-transmissive member is split along the plane of said third lens, for providing a means for separating and reconnecting said optical fibers.

21. A device as recited in claim 19 in which said third lens is a field lens.

22. A device as recited in claim 19 in which said third lens is defined by a cavity, and a second optional material in said cavity of said third lens, said index of refraction of said light-transmissive member being greater than said index of refraction of said first-mentioned optical material, the index of refraction of said second optical material being greater than said index of refraction of said light-transmissive member.

23. An optical interconnecting device comprising means for emitting light, a light-transmissive means having a predetermined index of refraction,
said emitting means being positioned so that light-transmissive means receives light therefrom,
an optical fiber unit including a fiber element having a substantially flat end face substantially perpendicular to the axis thereof, and abutment means having the axis of said fiber element as its center,
said light-transmissive means having a cavity defined by a surface of revolution positioned to receive light from said emitting means, said cavity having a tapered portion, said fiber unit being well biased axially toward said cavity with said abutment means engaging said tapered portion for centering said fiber element with respect thereto and spacing said end face from said surface of revolution,
and an optical material of predetermined index of refraction within said cavity filling the space between said end face and said surface of revolution, so that said surface of revolution and said optical material act as an immersion lens for receiving and refracting said light from said emitting means so that the same impinges upon said end face of said fiber element.

24. A device as recited in claim 23 in which said optical material is an index of refraction fluid and provides lubrication for preventing damage to said end face and to said surface of revolution.

25. A device as recited in claim 23 in which said fiber element is cylindrical, said abutment means being defined by the intersection of said substantially flat end face and the circumferential surface of said fiber element.

26. A device as recited in claim 25 in which said fiber element includes a core and a cladding around said core, said cladding defining said circumferential surface.

27. A device as recited in claim 25 in which said fiber element includes an unclad core, said core defining said circumferential surface.

28. A device as recited in claim 23 in which said optical fiber unit includes a member circumscribing said fiber element, said member defining said abutment means.

29. A device as recited in claim 28 in which said member is a ferrule having a circumferential surface coaxial with said fiber element, and an end face adjacent said end face of said fiber element, said abutment means being defined by the intersection of said circumferential surface and said end face of said ferrule.

30. A device as recited in claim 23 in which said cavity includes an inner portion of predetermined curvature for forming a lens surface, and an outer portion of a different curvature diverging outwardly from said inner portion for forming an entrance to said cavity.

31. A device as recited in claim 30 in which said outer portion is frustoconical.

32. A device as recited in claim 23 in which said light-transmissive means includes a second cavity,
said second cavity being axially aligned with said first-mentioned cavity and being defined by a second surface of revolution,
said emitting means being received in said second cavity and having an emitting surface spaced from said second surface of revolution,
and an optical material of predetermined index of refraction in said second cavity filling the space between said emitting surface of said emitting means and said second surface of revolution.

33. A device as recited in claim 32 in which said emitting means is a second optical fiber unit,
said second optical fiber unit including a second fiber element having a second substantially flat end face substantially perpendicular to the axis thereof for providing said emitting surface, and abutment means having the axis of said second fiber element as its center,
said second optical fiber unit being biased axially toward said second cavity with said second abutment means engaging said second surface of revolution for centering said second optical fiber element with respect thereto.

34. A device as recited in claim 32 in which said emitting means is a light source which generates the light emitted thereby.

35. A device as recited in claim 32 in which said emitting means includes
a light source producing a beam of noncircular shape and relatively large divergence,
a tapered waveguide receiving said beam and mixing and reflecting the same so that light emitted therefrom is in a beam of substantially circular shape and is less divergent than said beam emitted by said source,
said tapered waveguide being positioned adjacent said second cavity,
and an optical material engaging said light source and filling said tapered waveguide and said second cavity beyond said tapered waveguide,
said optical material having a predetermined index of refraction such that light emitted from said tapered waveguide is refracted at said second surface of revolution for so being transmitted through said light-transmissive means to said optical fiber element.

36. A device as recited in claim 32 in which said emitting means includes
a member in said second cavity,
said member having an opening therein axially aligned with said surface of revolution of said second cavity,
said opening tapering from a relatively narrow transverse dimension remote from said second surface of revolution to a relatively large transverse dimension adjacent said second surface of revolution,
a light source producing a light beam of noncircular shape of smaller area than that of said end face and relatively large divergence,
and means for positioning said light source at the axis of said opening at a location where said opening has a relatively narrow transverse dimension,
said member being transparent and having a predetermined index of refraction, said optical material in said second cavity extending into said opening and filling the same forwardly of said light source, said optical material having an index of refraction correlated with said index of refraction of said member such that said member at said opening defines a tapered waveguide for transmitting and mixing light from said source so that said light emitted from said opening is in a beam of substantially circular shape and is less divergent than said beam from said light source, said light from said tapered waveguide being refracted at said second surface of revolution for so being transmitted through said light-transmissive means to said optical fiber.

37. A device as recited in claim 36 in which said opening is circular in cross section.

38. A device as recited in claim 36 in which
said light source has a stripe emitting area producing a beam having a substantially elliptical pattern.

39. A device as recited in claim 38 in which said light source is a laser diode.

40. A device as recited in claim 38 in which said light source is a light emitting diode.

41. A device as recited in claim 36 in which
said member has a tapered wall,
said second cavity having a tapered wall engaged by said tapered wall of said member.

42. A device as recited in claim 41 including means biasing said tapered wall of said member against said tapered wall of said second cavity for aligning said member with said second cavity.

43. An optical interconnecting device comprising means for emitting light,
a light-transmissive means having a predetermined index of refraction,
said emitting means being positioned so that said light-transmissive means receives light therefrom,
an optical fiber having a substantially flat end face substantially perpendicular to the axis thereof, a circumferential wall, and a corner between said end face and said circumferential wall,
said light-transmissive means having a cavity defined by a surface of revolution of predetermined curvature positioned to receive light from said emitting means, said cavity having a tapered portion,
means for positioning said optical fiber with said end face within said cavity and for causing said optical fiber to exert an axial force urging said corner into engagement with said tapered portion so as to center said optical fiber with respect to said cavity and space said end face a predetermined distance from said surface of revolution,
and an optical material of predetermined index of refraction within said cavity filling the space between said end face and said surface of revolution,
whereby said surface of revolution and said optical material act as an immersion lens for receiving and refracting said light from said emitting means so that the same impinges upon said end face of said optical fiber.

44. A device as recited in claim 43 in which said positioning means includes means gripping said optical fiber at a location remote from said cavity.

45. A device as recited in claim 43 in which said positioning means includes opposed members, and means for urging said opposed members toward each other so that opposed members grip said optical fiber at a location remote from said cavity.

46. An optical interconnecting device comprising
a light-transmissive member having a predetermined index of refraction,
a light emitting device,
said light emitting device having a surface from which light is emitted, said light-transmissive member having a cavity therein defined by a surface of revolution, said cavity having a tapered portion,
means positioning said light emitting device such that said surface thereof is opposite from said cavity,
said light-transmissive member having a face adjacent said surface of said light emitting device,
an optical material between said surface of said light emitting device and said face of said light-transmissive member,
an optical fiber unit including
a fiber element having a substantially flat end face substantially perpendicular to the axis thereof,
and abutment means having the axis of said fiber as its center,
said fiber unit being biased axially toward said cavity with said abutment means engaging said tapered portion for centering said fiber element with respect to said cavity and spacing said end face from said surface of revolution,
and an optical material within said cavity filling the space between said end face and said surface of revolution,
the index of refraction of said optical material in said cavity and of said optical material between said surface of said light emitting device and said face of said light-transmissive member being substantially the same as the index of refraction of said light-transmissive member.

47. An optical connecting device comprising
a light-transmissive member having a predetermined index of refraction,
said member having a cavity therein defined by a surface of revolution,
said cavity having a tapered portion,
a light detector,
means positioning said light detector in opposed aligned relationship with said cavity,
an emitting optical fiber unit,
said optical fiber unit including a fiber element having a substantially flat end face, and abutment means having the axis of said fiber element as its center,
said fiber unit being biased axially toward said cavity with said abutment means engaging said tapered portion for centering said fiber element with respect thereto and spacing said end face from said surface of revolution,
and an optical material of predetermined index of refraction filling the space between said end face and said surface of revolution, whereby light emitted from said fiber element is transmitted by said light-transmissive member to said light detector.

48. A device as recited in claim 47 in which said light detector has a receiving area greater than the emitting area of said fiber element, and in which the index of refraction of said light-transmissive member is the same as the index of refraction of said optical material.

49. A device as recited in claim 47 in which said light detector has a receiving area no greater than the emitting area of said fiber element, and in which the index of refraction of said light-transmissive member is different from the index of refraction of said optical material such that light emitted by said fiber element is refracted at said surface of revolution so as to be transmitted to said light detector.

50. The method of providing a connection between a duality of cylindrical optical fibers for allowing the transmission of light from one to the other comprising the steps of, provided each of said fibers with an end face substantially perpendicular to the axis thereof so as to form a circular corner between said end face and the circumferential surface of said fiber, providing two cavities in a light-transmissive member such that said cavities face in opposite directions and are opposite from each other, with each cavity being defined by a surface of revolution and having a tapered portion, introducing into said cavities an optical material of predetermined index of refraction, then axially pressing each of said optical fibers into one of said cavities so as to bring said corner of said fiber into engagement with said tapered portion of said cavity receiving the same for centering said optical fiber in said cavity, and to result in a quantity of said optical material between said end face and said surface of revolution, whereby said cavities and optical material form lenses, and holding said fibers substantially axially aligned and so pressed into said cavities.

51. The method as recited in claim 50 in which at least one of said cavities is formed with an outer portion of a first curvature and an inner portion of a second curvature, said outer portion flaring outwardly from said inner portion so as to provide an entrance to said one cavity for facilitating said pressing of one of said optical fibers into said one cavity.

52. The method as recited in claim 51 in which said one fiber is caused to bear against said surface of revolution of said one cavity at a location sufficiently close to said inner portion to cause said inner portion to form the lens for substantially all light transmitted by said one fiber.

53. The method of transmitting light from a cylindrical optical fiber to another cylindrical optical fiber comprising the steps of, providing each of said fibers with an end face substantially perpendicular to the axis thereof so as to form a circular corner between said end face and the circumferential surface of said fiber, providing a light-transmissive member of predetermined index of refraction with opposite outer faces, forming in each of said outer faces a cavity defined by a surface of revolution, with said cavities having tapered portions and being positioned opposite from each other, introducing into said cavities an optical fluid of predetermined index of refraction, then axially pressing each of said optical fibers into one of said cavities so as to displace a portion of said optical fluid therefrom, to bring said corner of said fiber into engagement with said tapered portion of said cavity receiving the same so as to tend to center said optical fiber in said cavity, and to result in a quantity of said optical fluid entirely filling the space between said end face and said surface of revolution, whereby said cavities and optical fluid form lenses, and then emitting light from said end face of one of said fibers while simultaneously holding said fibers so pressed into said cavities for refraction by the lens receiving said one fiber, transmission through said light-transmissive member, and refraction by said lens receiving the other of said optical fibers for impinging upon said end face of said other optical fiber.

54. The method of providing a connection between a means for emitting light and cylindrical optical fiber for transmitting light from said means for emitting light to said optical fiber comprising the steps of, providing said fiber with an end face substantially perpendicular to the axis thereof so as to form a circular corner between said end face and the circumferential surface of said fiber, providing a cavity defined by a surface of revolution in a light-transmissive member having a predetermined index of refraction, with said cavity having a tapered portion, positioning said light-transmissive member relative to said means for emitting light such that said light-transmissive member receives light from said means for emitting light and transmits said light to said cavity, introducing into said cavity an optical material of predetermined index of refraction, axially pressing said optical fiber into said cavity after said optical material has been so introduced therein so as to bring said corner of said optical fiber into engagement with said tapered portion of said cavity for centering said optical fiber in said cavity, and to result in a quantity of said optical material between said end face and said surface of revolution, whereby said cavity and optical material form a lens, and holding said optical fiber so pressed into said cavity so that said light is refracted at said surface of revolution and transmitted to said optical fiber.

55. The method as recited in claim 54 in which said cavity is formed with an outer portion of a first curvature and an inner portion of a second curvature, said outer portion flaring outwardly from said inner portion so as to provide an entrance to said one cavity for facilitating said pressing of said optical fiber into said cavity.

56. The method as recited in claim 55 in which said fiber is caused to bear against said surface of revolution of said cavity at a location sufficiently close to said inner portion to cause said inner portion to form the lens for substantially all light transmitted to said fiber.

57. The method of transmitting light from a means for emitting light to a cylindrical optical fiber comprising the steps of, providing said fiber with an end face substantially perpendicular to the axis thereof so as to form a circular corner between said end face and the circumferential surface of said fiber, providing a light-transmissive member of predetermined index of refraction with an outer face, forming in said outer face a cavity defined by a surface of revolution with said cavity having a tapered portion, positioning said light-transmissive member relative to said means for emitting light such that said light-transmissive member can receive light from said means for emitting light and transmit said light to said cavity, introducing into said cavity an optical fluid of predetermined index of refraction, axially pressing said optical fiber into said cavity after said optical fluid has been so introduced therein so as to displace a portion of said optical fluid therefrom, to bring said corner of said fiber into engagement with said tapered portion of said cavity so as to tend to center said optical fiber in said cavity, and to result in a quantity of said optical fluid entirely filling the space between said end face and said surface of revolution, whereby said cavity and optical fluid form a lens, and then emitting light from said means for emitting light while simultaneously holding said fiber so pressed into said cavity for transmission through said light-transmissive member, and refraction by said lens for impinging upon said end face of said optical fiber.

* * * * *

UNITED STATES PATENT AND TRADEMARK OFFICE
CERTIFICATE OF CORRECTION

PATENT NO. : 4,119,362
DATED : October 10, 1978
INVENTOR(S) : MELVYN A. HOLZMAN

It is certified that error appears in the above-identified patent and that said Letters Patent are hereby corrected as shown below:

Column 2, line 18, "powr" should be --- power ---.

Column 2, line 32, "am" should be --- an ---.

Column 10, line 52, between "optimally" and "power" insert --- couple ---.

Column 10, line 59, second "space" should be --- outer ---.

Signed and Sealed this

Twenty-seventh Day of March 1979

[SEAL]

Attest:

RUTH C. MASON
Attesting Officer

DONALD W. BANNER
Commissioner of Patents and Trademarks